Figure 2:
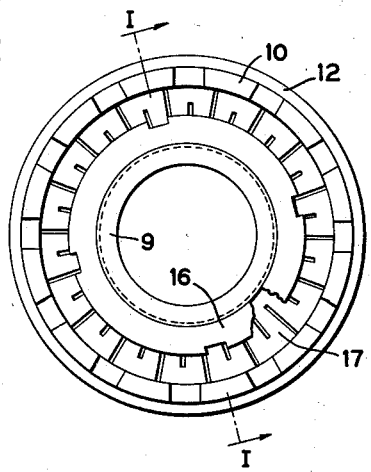

Aug. 26, 1958   E. F. W. MOELTZNER ET AL   2,849,104
APPARATUS FOR FEEDING AND ROLLING WORKPIECES
Filed June 24, 1953

INVENTOR
ERNST FRITZ WILHELM MOELTZNER
JOHANN HÜBL
BY Strauch, Nolan & Diggins
ATTORNEYS United States Patent Office 2,849,104
Patented Aug. 26, 1958

2,849,104

APPARATUS FOR FEEDING AND ROLLING WORKPIECES

Ernst Fritz Wilhelm Moeltzner, Berlin-Charlottenburg, and Johann Hübl, Berlin-Halensee, Germany, assignors, by mesne assignments, to Landis Machine Company, Waynesboro, Pa., a corporation of Pennsylvania Application June 24, 1953, Serial No. 363,730

Claims priority, application Germany July 15, 1952

8 Claims. (Cl. 198—211)

The invention relates to a transfer cylinder for machine tools, especially thread rolling machines, having carriers for work pieces arranged on the circumference of the cylindrical housing for transferring work pieces from a magazine to a working position preferably between rolls. It is known that the transfer cylinder with its cylindrical housing surrounds one roll and is motivated by the drive of that roll through a friction drive. As is known in the case of thread rolling machines, the transfer cylinder passes through the rolling space between the rolls and has a wall of sufficient thinness so that the work pieces in the carriers are not prevented from being rolled in the rolling space. Heretofore this transfer cylinder was made in one piece. The carriers for the work pieces were recesses cut into the wall of the cylindrical housing. It is a disadvantage that a one-piece transfer cylinder of this kind is useful only for work pieces of a fixed diameter since the diameter of the work piece must correspond to the size of the recess. In rolling the work pieces, the lower edge of the recess absorbs the pressure imposed on the work rest in the rolling process. In the case of detached work rest blades, the rest surface has previously been inlaid with carbide to avoid damage. It was not feasible to do this in the case of transfer cylinders so that it frequently occurred that the surfaces of the recesses corresponding to the work rest were damaged or broken away. The transfer cylinder could then no longer be used.

The invention avoids these disadvantages because the transfer cylinder is assembled from a supporting body and exchangeable segments secured therein, said segments forming the cylindrical housing and forming between each other transfer means for the work piece. The advantage lies in the exchangeability of single segments, in case one segment is broken out or the rest surface thereof is damaged. Furthermore, the segments can be reground and used for other diametrical sizes. A further advantage resides in the fact that the segments can be inlaid with hard metal so that the life of the transfer cylinder is substantially increased. The transfer cylinder is subjected to extremely high stresses by the automatic feeding of work pieces in the uninterrupted operation of the machine to which it is applied.

A suitable embodiment of the invention is one in which the segments and the supporting body are provided with interfitting arcuate guide means and are connected to each other by clamping means supported against the supporting body and the segments. It is of advantage, if arched spring disks, known per se, are used for fastening the segments, that the spring disks are disposed in an annular recess in the supporting body and are positioned with their outer edges against the inner sides of the segments and with their inner edges against the inner wall of the annular recess. The disks are pressed together by a nut which is threaded on the supporting body. This securing means for the separate segments is especially simple and the wedging action can be adapted to the stress produced, in accordance with the number of spring disks. Obviously other securing elements may also be used. Thus it is possible for the segments to have a wedging surface against which a wedging ring is pressed. The composite transfer cylinder also makes possible a change in the relative setting of the segments. It is also conceivable to provide several concentric guide means on the supporting body, in order to be able to use one supporting body for transfer cylinders of different diameters.

Figure 3:
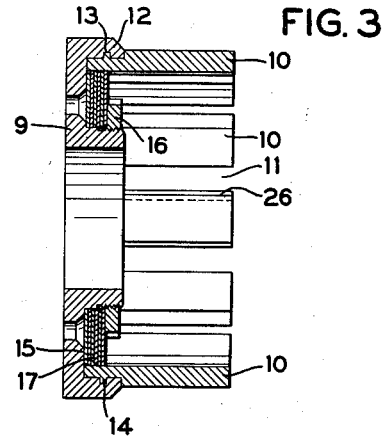
Figure 4:
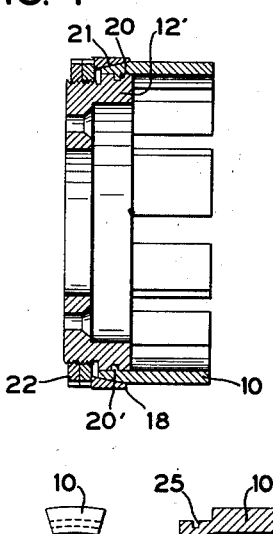
Figure 5:
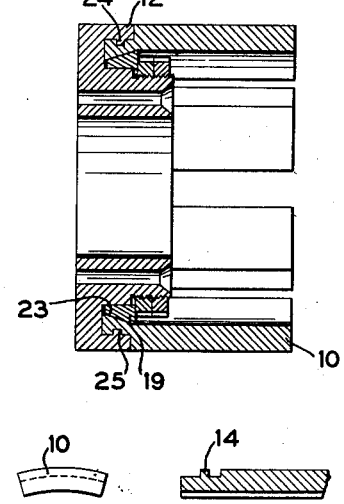
Figures 6, 7:
Figure 8:
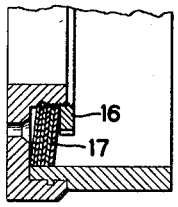
Figures 9, 10:
Figure 1:
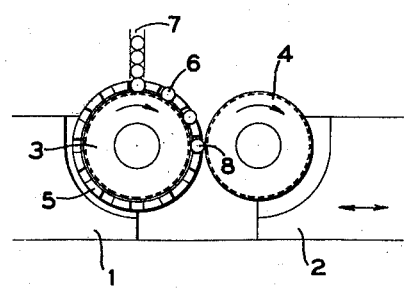

The subject matter of the invention is shown in the drawing in several embodiments. In the drawings:

Figure 1 shows schematically the arrangement of the transfer cylinder on a thread rolling machine provided with two rolls, Figure 2 is an elevation of an assembled transfer cylinder, Figure 3 is a sectional view along line I—I of Figure 2, Figures 4 and 5 show other embodiments of the transfer cylinder with the segments secured by a wedging ring, Figures 6 and 7 shows a segment of Fig. 5, in elevation and in section, Figure 8 shows a detail of Fig. 2 with unstressed resilient disks and Figures 9 and 10 shows a segment of Fig. 2, in elevation and in section.

In Fig. 1, the machine frame as designated 1 and 2 is the slide of a thread rolling machine. The rolls are designated by 3 and 4 and the transfer cylinder by 5. The work pieces 6 arrive at the working position 8 from the magazine 7 upon step by step rotation of the transfer cylinder. The transfer cylinder surrounds the roll 3 and passes through the rolling space between the rolls 3 and 4. When a work piece is in working position, the transfer cylinder is generally locked during rolling of the work piece.

The transfer cylinder is an assembly of the supporting body 9 and separate segments 10. The segments are arranged circularly and form collectively the cylindrical housing of the transfer body and also form, between each other, spaces or carriers 11 for the work pieces. The supporting body 9 has the cylindrical rim 12 having an annular groove 13 in which are engaged the arcuate projections 14 of the segments. Both parts constitute the guide means for the segments. The annular recess 15 at the bottom of the supporting body receives the spring disks 17 which are compressed into a packet by the ring nut 16. In Fig. 8, the spring disks are still arched and consequently exert no pressure on the segments. In Fig. 3 the nut 16 is screwed tight and the segments 10 are securely connected to the supporting body 9 by the compressed spring disks. In Figs. 4 and 5 the wedging rings 18 and 19, respectively, serve as the clamping means. The rim 12' of the supporting body, which extends in the direction of the cylindrical housing has on its outer circumference the annular groove 20 which is engaged by the projections 20' of the segments 10. The tapered wedging surfaces 21 of the segments 10 are contacted by the overlapping wedging ring 18, which is tightened by the nuts 22 so that the force component operates to press the segments against the supporting body. The modification of Fig. 5 is merely one in which the wedging ring 19 is arranged in the interior. The similarly internal tapered surfaces of the segments 10 are designated by 23. The rim 12" has, on its inner surface, the annular tongue 24 while the segments are provided with arcuate grooves 25. The segments may be provided with carbide inserts on their work supporting surfaces as indicated by dotted lines in Fig. 3.

When the segments are to be installed or exchanged, it is merely necessary to loosen the screw means operating on the clamping means. Without the clamping means the segments can be removed from the arcuate guide means and replaced by other pigments. The clamping means are then retightened and all segments are secured to the supporting body simultaneously.

We claim:

1. A transfer cylinder for conveying work pieces to a work forming station and supporting said work pieces at said station comprising, a body member, said body member having a substantially cylindrical rim concentric with the axis of said transfer cylinder, a plurality of transfer segments each having an arcuate portion formed on substantially the same radius as the rim of said body member, a mating groove and ridge construction on said rim and said segments, and clamping means for positively retaining said segments on said body with said arcuate portion on said segments in engagement with said cylindrical rim on said body and said groove and ridge construction in interfitting relation, said segments being spaced apart along their entire lengths to form work piece receiving recesses therebetween.

2. The transfer cylinder according to claim 1 wherein at least one edge of each of said segments is provided with a hardened metal insert for supporting said work pieces at said work forming station.

3. A transfer cylinder for conveying work pieces to a work forming station and supporting said work pieces at said station comprising, a body member, said body member having a substantially cylindrical rim concentric with the axis of said transfer cylinder, a plurality of transfer segments each having an arcuate portion at one end formed on substantially the same radius as said rim, cooperating arcuate guide means formed on said rim and said end portions of each of said segments, annular retaining means adapted to wedgingly engage each of said segments for positively retaining said segments on said rim in spaced relation along their entire lengths to form work piece receiving recesses therebetween with said arcuate portion of said segments in engagement with said rim and said arcuate guide means in interfitting relation, and means on said body for forcing said annular retaining means into engagement with each of said segments.

4. A transfer cylinder for conveying work pieces to a work forming station and supporting said work pieces at said station comprising, a body member having a rim concentric with the axis of said transfer cylinder, a plurality of transfer segments, mating guiding and supporting surfaces formed on said rim and one end of each of said segments, annular retaining means adapted to wedgingly engage each of said segments to hold said segments on said body with said mating guiding and supporting surfaces in engagement, said segments being spaced apart along their entire lengths to form work piece receiving recesses therebetween, and means on said body for forcing said annular retaining means into engagement with each of said segments.

5. The transfer cylinder according to claim 4 wherein said annular retaining means comprises a plurality of spring rings adapted to engage said body around their inner periphery and to engage said segments around their outer periphery.

6. The transfer cylinder according to claim 4 wherein said annular wedging means comprising a wedging ring having a beveled surface adapted to engage a mating bevel surface on each of said segments.

7. A transfer cylinder for conveying work pieces to a work forming station and supporting said work pieces at said station comprising a body member, said body member having a substantially cylindrical rim concentric with the axis of said transfer cylinder, a plurality of elongated transfer segments each having a body laterally curved about the axis of said transfer cylinder and having an arcuate end portion formed on substantially the same radius as said rim, a mating arcuate groove and ridge construction on said rim and said segments formed in a plane normal to the axis of said cylinder, annular retaining means for positively retaining said segments on said body with said arcuate portion of said segments in engagement with said rim and said groove and ridge construction in interfitting relation, said segments being spaced apart along their entire lengths and having their longitudinal axes parallel with the axis of said cylinder to form spaces therebetween to receive work pieces with their axes parallel with the axes of said transfer cylinder.

8. The transfer cylinder according to claim 7 wherein a hardened metallic insert is provided in at least one lateral edge of each of said segments for supporting said work pieces at said forming station.

References Cited in the file of this patent

UNITED STATES PATENTS

| | | |
|---|---|---|
| 743,737 | Lewis | Nov. 10, 1903 |
| 1,018,706 | Hainsworth | Feb. 27, 1912 |
| 1,728,341 | Golding | Sept. 17, 1929 |
| 2,023,561 | Williams | Dec. 10, 1935 |
| 2,048,265 | Hatebur | July 21, 1936 |
| 2,133,009 | Ballash | Oct. 11, 1938 |